US006523139B1

(12) United States Patent
Banning et al.

(10) Patent No.: US 6,523,139 B1
(45) Date of Patent: Feb. 18, 2003

(54) SYSTEM AND METHOD FOR FAIL SAFE PROCESS EXECUTION MONITORING AND OUTPUT CONTROL FOR CRITICAL SYSTEMS

(75) Inventors: Ronald Ray Banning, Albuquerque, NM (US); Emray Rein Goossen, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/467,111

(22) Filed: Dec. 17, 1999

(51) Int. Cl.[7] .................................................. G06F 11/30
(52) U.S. Cl. ........................ 714/43; 714/736; 714/797
(58) Field of Search ............................ 714/43, 44, 736, 714/797, 21, 30, 47, 56

(56) References Cited

U.S. PATENT DOCUMENTS

| 5,068,778 A | | 11/1991 | Kosem et al. ............... 364/138 |
| 5,274,554 A | * | 12/1993 | Takats et al. .............. 244/76 R |
| 5,307,409 A | | 4/1994 | Driscoll et al. |
| 5,343,474 A | | 8/1994 | Driscoll et al. |
| 5,386,424 A | | 1/1995 | Discoll et al. ................. 371/36 |
| 5,498,912 A | | 3/1996 | Templeman et al. |
| 5,550,736 A | * | 8/1996 | Hay et al. .................. 244/76 R |
| 5,753,927 A | | 5/1998 | Schneider |
| 5,881,971 A | * | 3/1999 | Hickman ..................... 244/195 |
| 5,920,715 A | | 7/1999 | Heckel et al. ............... 395/680 |
| 6,243,838 B1 | * | 6/2001 | Liu et al. ..................... 714/43 |
| 6,389,335 B1 | * | 5/2002 | Vos ............................. 244/194 |

FOREIGN PATENT DOCUMENTS

| EP | 0754990 A2 | 7/1996 | ............ G05B/9/03 |
| WO | WO 97/49020 | 12/1997 | ........... G05B/23/02 |

OTHER PUBLICATIONS

T. Driscoll, K. Hoyme; "SAFEbus"; DASC'92 (reprinted in IEEE Aerospace and Electronic Systems Magazine, vol. 8, No. 3 Mar. 1993).

* cited by examiner

*Primary Examiner*—Scott Baderman

(57) ABSTRACT

Methods and systems for fail-safe process execution, monitoring and output control for critical systems operating on an open bus architecture with multiple, independent partitions on a single processor is presented. The control system state variables and their status of critical systems, within the control laws and mode logic, are monitored for process completion and health, and shut down if necessary. The embodiments provide for a dual path for shut down of, for example, flight critical systems so that the failure of one partitioned module does not affect the operation of the remaining partitioned modules. One path involves the CPM and IOM determination of command/response health. If persistent faults are detected, then either the DSP monitoring or the CPM performance monitoring results in a discrete signal being sent to the H-bridge disable to shutdown the current output. The second path is CPM controlled via a separate discrete signal on the input/output controller to the flight critical system shut-off valve. By implementing these separate paths, critical systems in one partition cannot be defeated by a single failure in another partition.

16 Claims, 4 Drawing Sheets

SYSTEM AND METHOD FOR FAIL SAFE PROCESS EXECUTION MONITORING AND OUTPUT CONTROL FOR CRITICAL SYSTEMS

CROSS-REFERENCE TO RELATED APPLICATIONS

Not applicable.

BACKGROUND OF THE INVENTION

The present invention relates generally to the field of redundant information transmission over multiple communication paths. More specifically, the present invention relates to systems and methods for fail-safe process execution, monitoring and output shutdown for critical systems using multiple communication paths and partitioned processing systems.

Processors are used in a vast array of applications, from simple single processor controlled systems to complex flight critical systems where high integrity output from multiple processors may be required. Processor and related module functions may stand alone within one system or may be tied to other processing systems on a bus, or accessible through a network. It is generally desirable that reliable mechanisms be available when a controlled system failure is detected in complex systems.

In flight critical systems, for example, current practices generally employ an array of, or a redundant set of, federated computers (meaning controlled by a single processor). Single I/O threads may be used as a redundant set in order to accomplish a flight critical function like a flight control algorithm. The way federated systems are monitored is generally through a voting scheme, wherein each output of a component would be voted on/recorded. The logical outputs are generally averaged; therefore, a failing or malfunctioning module may be eliminated from the system before outputs were applied to a control surface in order to save an aircraft. One pathology of this practice is that, in order for a module to be, voted out of a system, it must be allowed to fail. Awaiting failure of a module-in-order to get it voted out of the system generally causes upsets of the system and/or its operation. Such upsets can produce a fatal outcome in a flight critical systems.

In the application of flight critical functions for fly-by-wire systems, failures in the processing element must be contained from continuing to influence the flight control surfaces of the aircraft. For example, servo drives need to be safely shut off if a processor or other critical function within the processor ceases to operate properly. One common method of identifying faults in fly-by-wire systems generally solves faults through software ticket checking of critical processes, and via hardware watch dog timer monitoring of processor health. The output of the watch dog timer may then be used to shut down critical systems, such as servo drive outputs and shut off hydraulic valves.

Typically, a monitoring program examines the outputs of a primary system and/ or its function, and based on unique design criteria, decides whether the system/function is operating/executing correctly or not. Detection of random faults is generally augmented with custom-designed built-in self-test programs that exercise various parts of the system (e.g, actuator)/function (e.g, software sequence) and compares the results against known-good results. Because these tests are not continuous, and are subject to less than 100% coverage of random faults, there is an exposure time where a fault can occur which manifests itself in incorrect outputs to all functions which rely on that resource. Watchdog timers are usually present to detect those faults that result in the function not executing at all. But such timers do not detect incorrect results from a function that does complete its execution. The monitor function is generally counted on to detect error conditions.

What is needed is a more robust, more secure means of monitoring systems for faults and making sure that a fault is caught and associated outputs are shutdown, or otherwise ignored, before they propagate as a control input within a system.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

Through integrated module technology, separate processors and/or associated operations are integrated onto a single computing platform to improve process monitoring and enable controlled shut downs that would normally be implemented in separate components or through independently controlled processes.

In accordance with one aspect of the present invention, a single computer (instead of multiple computers) having a backplane providing a partitioned platform enabling a central set of imbedded (virtual) processors as computing platforms to be shared, through the partitioning system, are allowed to execute software functions as if multiple processors are operating, rather than a single computers. The virtual processors are protected/isolated from each other through a partitioning mechanism so a failure on one software element on this integrated platform cannot be propagated and effect another processor and/or computation.

In accordance with another aspect of the present invention, a fault detection apparatus for use in a system that transmits data signals over a plurality of signal paths via a bus with multiple independent partitions on a single processor is provided. Shared memory stores the status of reference control system state variable parameters. A status monitor monitors status of real-time control system state variable parameters, the control system state variable parameters characterizing a plurality of critical systems that communicate on the bus, the control system state variables present on the bus. A state comparator compares the reference control system state variables with respect to the real-time control system state variable parameters. A system controller controls critical systems based on the comparison of the real-time control system state variable parameters against reference control system state variable parameters.

In accordance with another aspect of the present invention, a single processor system partitioned to operate, monitor and control more than one flight critical process is described where more than one flight control software related process operates simultaneously on a single partitioned processor; a partitioning mechanism partitions a single processor into virtual processors dedicated to a single process without interference from other processes; and shared memory is provided for storing programs and data for said more than one flight control software related process.

In accordance with another aspect of the present invention, a method for executing, monitoring and controlling multiple functions with a single processor system is described, wherein a single processor partitionable into plural operating processes that can operate simultaneously and without interference with other processes is provided; a memory may be shared by the plural operating processes; a monitoring architecture for detecting operational success and failures of said processes is provided; and a control architecture for assured that failed processes are controlled or terminated without interference of successful processes is provided.

The novel features of the present invention will become apparent to those of skill in the art upon examination of the following detailed description of the invention or can be learned by practice of the present invention. It should be understood, however, that. the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and that are incorporated in and form part of the specification, further illustrate the present invention and, together with the detailed description of the invention, serve to explain the principles of the present invention.

DETAILED DESCRIPTION OF THE INVENTION

Aspects of the present invention provide systems and methods for monitoring high criticality processes. With a failed piece of software or hardware, the monitoring described in the present invention will still very likely be operative to catch the fault and then shut down the system without it ever issuing a command. The present invention enables isolation of fault(s) closer to the point at which the fault(s)are created; meaning faults are less likely to find their way through, or out of, a system utilizing the teachings of the present invention and propagate to other components and/or operations.

Although the following disclosure will make reference to avionics systems, it should be appreciated that the present invention may have broader applicability in the field of critical processing systems (e.g., medical systems). Particular values and configurations discussed in examples can be varied and are cited merely to illustrate an embodiment of the present invention and are not intended to limit the scope of the invention. Any reference to avionics systems should not be taken as a limitation of the scope of the teachings presented herein and embodied within the appended claims.

Figure 1:
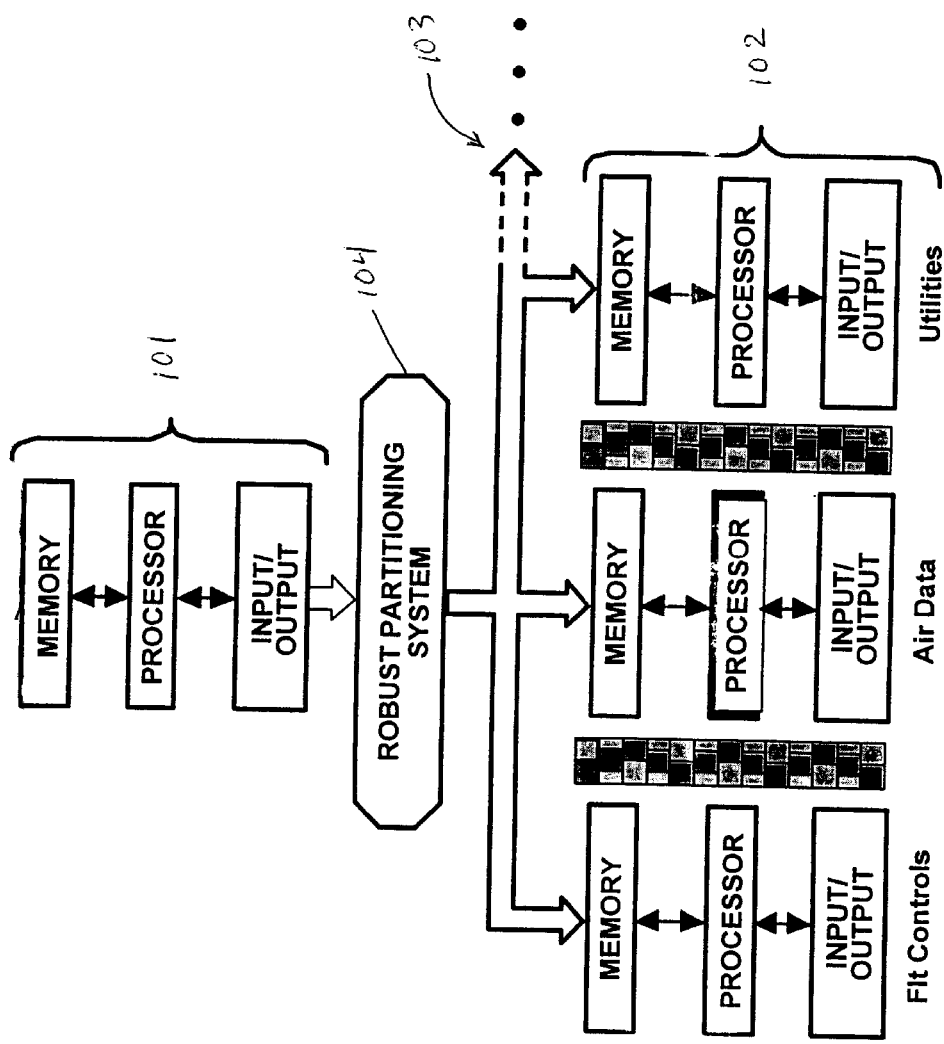
FIG. 1 is a block diagram of a integrated modular avionics partition protection utilizing a single computer to virtually represent multiple processing functions in accordance with the present invention.

Referring to FIG. 1, with teaching of the present invention, monitor programming may be programmed into active system components of a single computing platform 101, rather than taking the form of stand alone systems, or remotely controlled solutions. Virtual computing components 102 perform independent functions and communicate with each other through or over a bus 20 (e.g., a bus such as the SAFEbus® defined in U.S. Pat. No. 5,386,424) 103 as part of a partitioning mechanism 104.

The present invention extends the fault detection capability beyond simply monitoring the execution of a singular process execution completion or output validity. Although implementation of a traditional ticket checking mechanism for module completion monitoring could be implemented, it is unnecessary. The present invention has the capability to monitor the update of individual state variables within the control laws and/or mode logic. Control laws and mode logic are generally determined in a manner known to those skilled in the art based on the particular flight system. The present invention monitoring is based on individual variable recalculation and update rather than monitoring of overall process completion. This facilitates the monitoring of autocoded software making it unnecessary to break up a software block into smaller modules just to manage testing and monitoring, and simplifies the redundancy management effort.

Figure 2:
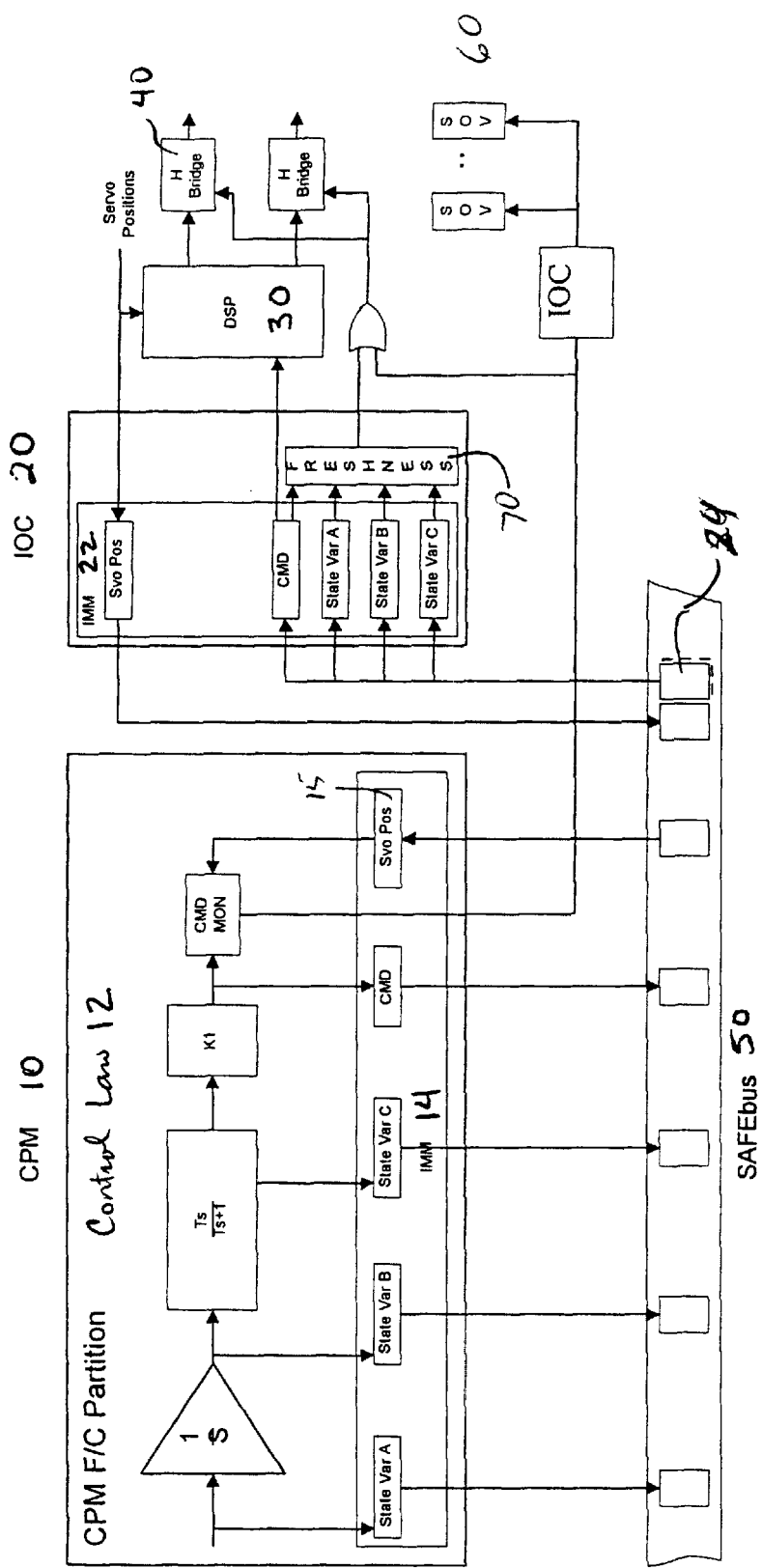
FIG. 2 is an illustration of a servo fault shutdown mechanism in accordance with one example of the present invention.

Referring to FIG. 2, an exemplary embodiment provides the monitoring of servo mechanisms (not shown), and providing for their shutdown via a IOC 20 depending on the results of monitoring. A SAFEbus® backplane 50 having a bus interface unit (BIU) 24 and intermodule memory (IMM) 14 and 22, supplemented with discrete shutdown signals directed to the servo loop output electronics 60 and SVO pos feedback 15, provide mechanisms useful for monitoring: process completion, CPM health, IOC health, DSP health, and servo loop closure. The result is a solution that provides not only protection from a CPM 10 partition failure, but also protection from failures in the remaining loop elements such as the Input/Output Controller (IOC) 20 and servo drive electronics (not shown).

The servo shutdown mechanism as shown in FIG. 2 is a flight critical system. The embodiment illustrated in the figure provides a dual path for servo shut down. One path involves the CPM 10 and its determination of command/response health. If persistent faults are detected, then either the DSP 30 monitoring or the CPM 10 performance monitoring results in a discrete signal being sent to the H-bridge disable modules 40 to shutdown the current output. The second path is CPM controlled via a separate discrete on the IOC 20 to the servo shut-off valve 60. By implementing these two separate paths, servo shutdown cannot be defeated by a single failure.

The CPM 10 is executing a simple control law shown as the algorithm in the CPM 10 module for which all state variables A, B, and C (although three variables are illustrated, any number can be used) are placed into the IMM 14. The state variables A, B, and C represent state variables such as pitch stick, signal selection and monitoring, pitch integral, etc. The SAFEBUS® architecture generally requires state variables A, B, and C to be placed into the IMM 14 for transmission to the other VMS channels via the SAFEBUS®. Because these variables are already placed on the SAFEBUS®, the IOC 20 SAFEBUS® table memory is then designed to select key variables (e.g., pitch stick, signal selection and monitoring, pitch integral, etc.) for "freshness monitoring". Freshness monitoring refers to the condition wherein input data is stale (e.g., has not been updated as determined by time-tagged data). If the command or key variable is not updated, then the IOC 20 will disable the servo commands by issuing a discrete signal through a H-bridge cutoff 40. Conversely, if a failure occurs in the IOC 20, DSP 30, or servo loop closure, then the CPM 10 will detect either a command-position error or a lack of data freshness on the SVO position 15 feedback. In this case, the CPM 10 issues a direct discrete disable to the servo commands through the H-bridge cutoff 40.

All data to be transferred on the backplane of the bus 50 is placed into its local IMM (e.g., 14 or 22) by the module that transmits the data, i.e., the CPM 10, or IOC 20. Bus Interface Unit (BIU) on each module transfer data from the local IMM to the backplane of the bus 50. At the receiving end, BIU again receive the data from the bus and place it into its local IMM. One of the key features of the SAFEBUS® standard requires that data not updated in the IMM since its last transmission will not be placed again on the bus 50 during its next scheduled transmission. All data in the IMM is time stamped by the writer of the data item. Processes that use the data simply need check the time stamp to determine if input data is stale, i.e., has not been updated. This staleness detection provided by SAFEBUS® system provides the freshness monitoring that the IOC 20 utilizes to monitor the health of CPM 10.

Core operating system software (described as partitioned within a single computing platform layer 101 of FIG. 1) may monitor every CPM process for completion. Reaction to failures is determined by the operating system and may result in the process being retried and terminated if it continues to fail. The execution of the core operating system software is then critical. A hardware heartbeat monitor built into the CPM 10 may be used to insure that the core software is executing at proper intervals. If this heartbeat monitor fails, then the CPM 10 will reset and attempt to reinitialize. The net result of this action will be the same as the situation with a single process failing (e.g., stale data is detected by the IOC 20 and the servo loop is shutdown).

Figure 3:
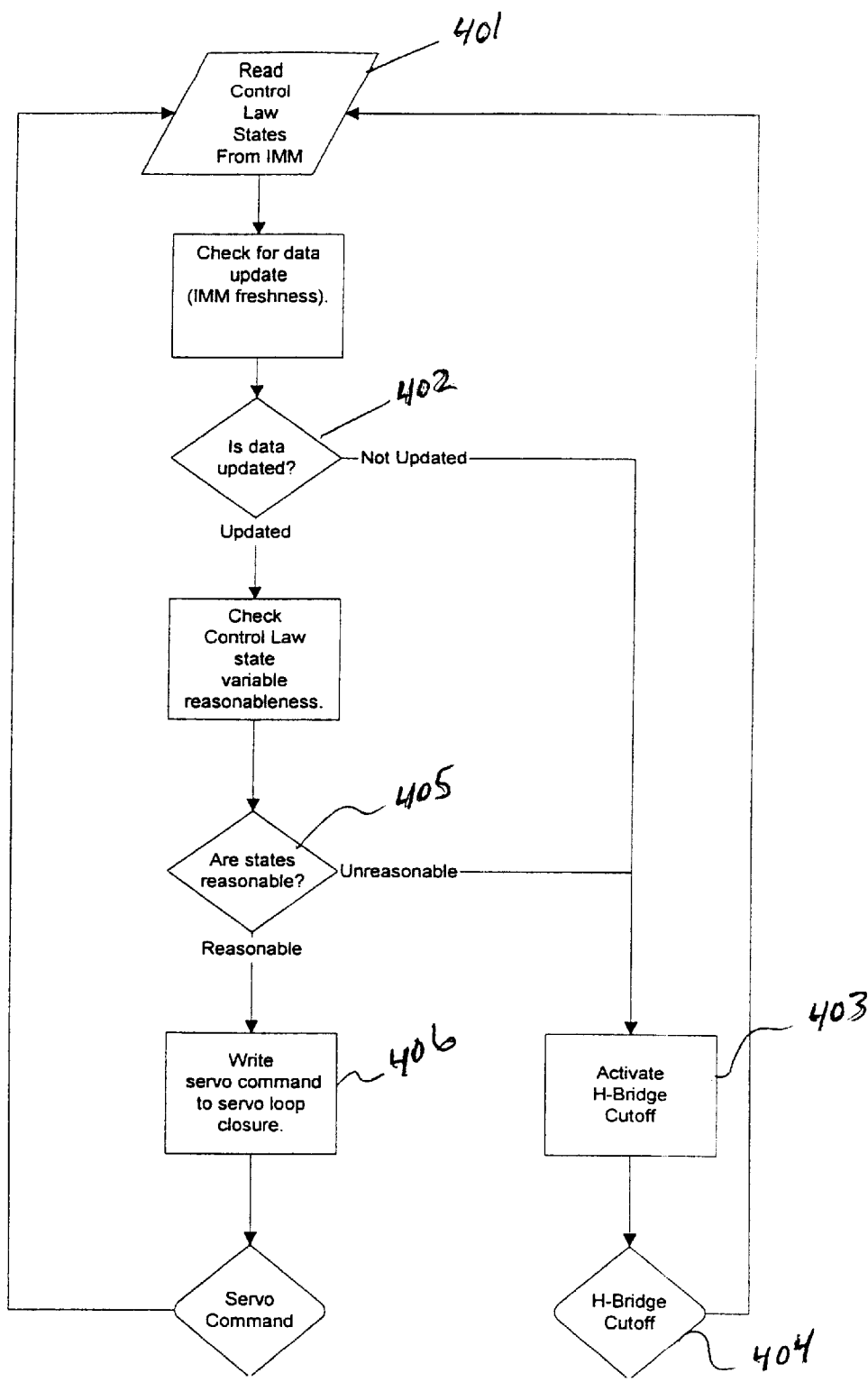
FIG. 3 is an illustration of a servo monitor process flow of an Input/Output Module (IOM)

Referring to FIG. 3, a flowchart for the monitoring process that would occur in the IOC 20 is described. The controller, through information that was passed along the backplane, reads data 401 from the IMM and determines 402 if the data is fresh. If the data is not fresh (updated), then a shut down would be activated through the h-bridge cutoff 403. The IMM would continue to seek updates, and will determine if a cut-off was initiated 404. If the data received by the IMM is updated 402, then the variable reasonablness of the operating mechanism is determined 405. If the IMM detects unreasonableness after checking the data through the control law, then an H-bridge cut-off 403 is initiated, and the IMM will again receive an update 401. Otherwise, if reasonableness is determined, a servo command is written 406 to the servo loop, and feedback 407 is provided to the IMM. Feedback is via a bus, and will find its way to the IO controller to actually drive the commands through the H-bridges. So if it clears this monitoring set of checks, then CPM would set its data on and again these H bridges would be active.

Figure 4:
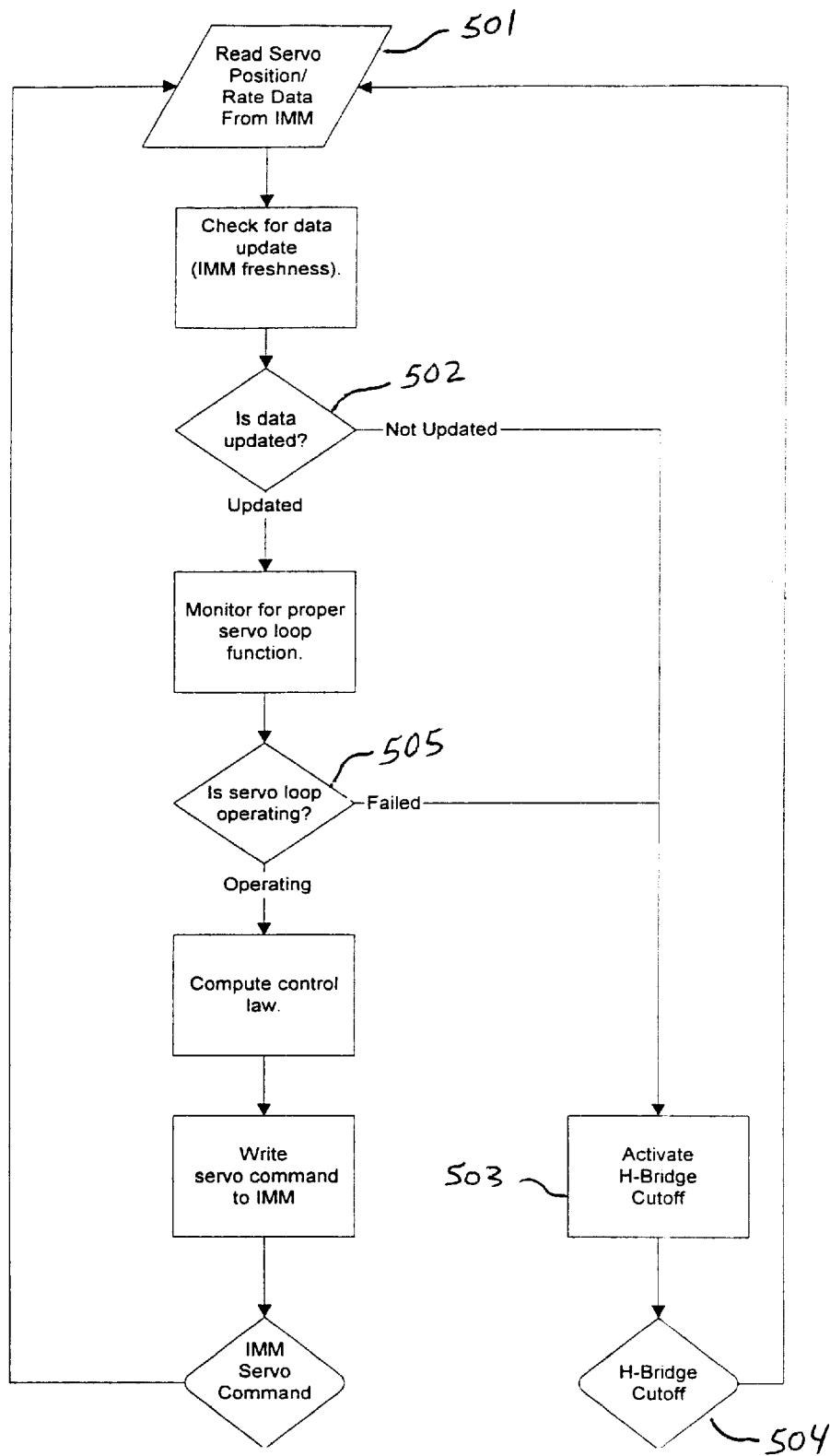
FIG. 4 is an illustration of a servo monitor process flow for a core processing module (CPM).

Referring to the process illustrated in FIG. 4, within the core processing module, servo position data is received 501 and is determined if the data had been updated 502. The data that the actuators are moving would be coming back into the IOC onto the SAFEBUS® to the core processor. It would read those positions out of the bus memory, check to see that this was fresh data, if not, it too would then go through the same process where it would be able to activate the safe shutdown via the H-Bridge cutoff valves 503. Otherwise, as opposed to monitoring to see that this calculation was done correctly the data is monitored to make sure that the servo loop is operating (being closed) correctly 505. If not properly operating, the H-bridge cutoffs are again initiated 503. If proper operation is determined, the next command enters a supposition comparison to FIG. 3.

The embodiments described above address not only the initial issue of partition/process failure, but extends naturally to an overall monitoring approach that includes, as an example only, all of the processing elements used to generate servo commands. Because the SAFEBUS® backplane, core operating system software, and state variable transfers are already in place, there is virtually no overhead to the monitoring scheme. The mechanism also provides a very robust and minimal impact monitoring for autocoded software.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics as long as the principle, the presentation of an individual state variable monitoring capability, is followed. It is intended that the scope of the present invention be defined by the claims appended hereto.

The embodiments of the present invention in which an exclusive property or right is claimed are defined as follows:

1. A fault detection apparatus for use in a system that transmits data signals over at least one signal path via a bus connecting computation and I/O modules of a system, the apparatus comprising:

a status monitor for monitoring validity of real-time control system state variable parameters, wherein the real-time control system state variables are made available to an independent partition, process, or module for independent monitoring of intermediate steps in a functions calculation, the control system state variable parameters characterizing a plurality of critical systems that communicate on the bus, wherein the control system state variables are present on the bus;

a state comparator comparing the real-time control system state variables with respect to expected system state variable conditions;

variable producing controller and variable consuming controller for validating output command validity based on expected individual state variable conditions; and memory for storing state variable parameters.

2. The apparatus of claim 1 further comprising a termination for failed critical systems without affecting the operation of other critical systems, being executed on a same module, based on the comparison of the real-time control system state variable parameters against expected system state variable conditions.

3. The apparatus of claim 1, wherein said status monitor is operable to monitor failures within individual computational partitions or processes.

4. The apparatus of claim 1, wherein said status monitor is operable to select key control system state variable parameters for monitoring.

5. The apparatus of claim 1, wherein said apparatus is operable to terminate any one of the critical system processes if the comparison of the real-time system state variable parameters against expected system state variable conditions results in a value that is not expected with respect to the expected system state variable conditions.

6. The apparatus of claim 1, wherein said monitor provides full critical closed loop monitoring and said apparatus provides termination within a control loop.

7. A fault detection system for a single processor system partitioned to operate, monitor and control more than one flight critical process, comprising:
   a single partitioned processor for simultaneously operating more than one flight control software related process;
   a status monitor for monitoring validity of real-time control system state variable parameters operating within said processor, wherein the real-time control system state variables are made available to an independent partition, process, or module for independent monitoring of intermediate steps in a functions calculation, the control system state variable parameters characterizing a plurality of critical systems that communicate via at least one bus, wherein the control system state variables are present on the at least one bus;
   a state comparator comparing the real-time control system state variables with respect to expected system state variable conditions;
   variable producing controller and variable consuming controller for validating output command validity based on expected individual state variable conditions; and
   memory for storing state variable parameters.

8. The system of claim 7 wherein said apparatus further comprises a termination for failed critical systems without affecting the operation of other critical systems, being executed on a same module, based on the comparison of the real-time control system state variable parameters against expected system state variable conditions.

9. The system of claim 7, wherein said status monitor is operable to monitor failures within individual computational partitions or processes.

10. The system of claim 7, wherein said status monitor is operable to select key control system state variable parameters for monitoring.

11. The system of claim 7, wherein said apparatus is operable to terminate any one of the critical system processes if the comparison of the real-time system state variable parameters against expected system state variable conditions results in a value that is not expected with respect to the expected system state variable conditions.

12. The system of claim 7, wherein said monitor provides full critical closed loop monitoring and said apparatus provides termination within a control loop.

13. A method for fault detection within a system that executes, monitors and controls multiple function within a single processor system that transmits data signals over at least one signal path via a bus connecting computation and I/O modules of a system, the method comprising:
   monitoring the status of real-time control system state variable parameters, wherein monitoring is programmed into the computation and I/O modules, the control system state variable parameters characterizing a plurality of critical systems that communicate on the bus, wherein the control system state variables are present on the bus;
   comparing the real-time control system state variable parameters with respect to expected system state variable conditions; and
   validating output command validity based on expected individual state variable conditions.

14. The method of claim 13 wherein said output command validity is stored in a memory.

15. The method of claim 13 wherein said expected system state variable conditions are retrieved from a memory.

16. The method of claim 13 wherein monitoring is conducted via a bus as part of a partitioned processor architecture.

* * * * *